US009195390B2

(12) United States Patent
Wu

(10) Patent No.: US 9,195,390 B2
(45) Date of Patent: Nov. 24, 2015

(54) METHOD FOR CONTROLLING DISPLAY OF VEHICULAR IMAGE BY TOUCH PANEL AND VEHICULAR IMAGE SYSTEM THEREOF

(71) Applicant: Avisonic Technology Corporation, Hsin-Chu (TW)

(72) Inventor: Ming-Yang Wu, Hsinchu (TW)

(73) Assignee: AVISONIC TECHNOLOGY CORPORATION, Hsin-Chu (TW)

( * ) Notice: Subject to any disclaimer, the term of this patent is extended or adjusted under 35 U.S.C. 154(b) by 166 days.

(21) Appl. No.: 13/861,392

(22) Filed: Apr. 12, 2013

(65) Prior Publication Data
US 2014/0132527 A1    May 15, 2014

(30) Foreign Application Priority Data

Nov. 14, 2012   (TW) .............................. 101142440 A

(51) Int. Cl.
G06F 3/0488   (2013.01)
H04N 5/232    (2006.01)

(52) U.S. Cl.
CPC .......... *G06F 3/04883* (2013.01); *G06F 3/0488* (2013.01); *H04N 5/23216* (2013.01); *H04N 5/23293* (2013.01); *H04N 5/23296* (2013.01); *B60K 2350/1028* (2013.01); *B60K 2350/1052* (2013.01)

(58) Field of Classification Search
CPC combination set(s) only.
See application file for complete search history.

(56) References Cited

U.S. PATENT DOCUMENTS

| 6,917,693 | B1* | 7/2005 | Kiridena et al. | 382/104 |
|---|---|---|---|---|
| 8,319,617 | B2* | 11/2012 | Ohshima et al. | 340/435 |
| 8,446,268 | B2* | 5/2013 | Hideshiro | 340/435 |
| 2004/0169762 | A1* | 9/2004 | Imoto | 348/340 |
| 2006/0028542 | A1* | 2/2006 | Rondinelli et al. | 348/36 |
| 2011/0001722 | A1* | 1/2011 | Newman et al. | 345/174 |
| 2011/0074916 | A1* | 3/2011 | Demirdjian | 348/36 |
| 2011/0096089 | A1* | 4/2011 | Shenhav et al. | 345/619 |
| 2011/0279673 | A1* | 11/2011 | Teich et al. | 348/148 |
| 2011/0317014 | A1 | 12/2011 | Onaka | |
| 2012/0169861 | A1* | 7/2012 | Szczerba et al. | 348/78 |
| 2012/0257058 | A1 | 10/2012 | Kinoshita et al. | |
| 2014/0136054 | A1* | 5/2014 | Hsia | 701/42 |

FOREIGN PATENT DOCUMENTS

| JP | 20016097 A | 1/2001 |
|---|---|---|
| JP | 2003116125 A | 4/2003 |
| JP | 20065451 A | 1/2006 |
| JP | 200674105 A | 3/2006 |
| JP | 200983744 A | 4/2009 |
| JP | 2010258878 | 11/2010 |
| JP | 2010258878 A | 11/2010 |
| JP | 2011-135253 | 7/2011 |
| JP | 2011205514 A | 10/2011 |

(Continued)

*Primary Examiner* — Lun-Yi Lao
*Assistant Examiner* — Kelly B Hegarty
(74) *Attorney, Agent, or Firm* — Muncy, Geissler, Olds & Lowe, P.C.

(57) ABSTRACT

A method for controlling a display of a vehicular image by a touch panel is provided. The vehicular image is synthesized by a plurality of sub-images. The method includes the following steps: detecting a first touch event on the touch panel to generate touch position information; determining a control parameter according to the touch position information; and switching a viewing-angle stage of the vehicular image according to the control parameter.

18 Claims, 10 Drawing Sheets

(56) References Cited

FOREIGN PATENT DOCUMENTS

| JP | 201273836 A | 4/2012 |
| JP | 201291625 A | 5/2012 |
| JP | 2012124610 A | 6/2012 |
| JP | 2012169723 A | 9/2012 |

* cited by examiner

METHOD FOR CONTROLLING DISPLAY OF VEHICULAR IMAGE BY TOUCH PANEL AND VEHICULAR IMAGE SYSTEM THEREOF

BACKGROUND OF THE INVENTION

1. Field of the Invention

The disclosed embodiments of the present invention relate to display control of a vehicular image, and more particularly, to a method for controlling a display of a vehicular image by a touch panel and a related vehicular image system.

2. Description of the Prior Art

An around view monitor system (AVMS) provides an around view monitor (AVM) image/bird's-eye view image around a vehicle, which enables the driver to monitor the surrounding conditions of the vehicle in real time. A vehicle having an AVMS may be equipped with a plurality of image capture devices (e.g. cameras) to capture a plurality of vehicle-surrounding images. The vehicle-surrounding images are synthesized by an image operation including a geometric correction to generate an AVM image. In a conventional vehicular image system, the viewing-angle switching of a vehicular image is realized by physical buttons, direction indicators and/or backup lights, wherein a display of the vehicular image is only switched to a front view picture (displaying a view from the front of the vehicle), a side view picture (displaying a view from the right/left side of the vehicle), a rear view picture (displaying a view from the back of the vehicle) or a top view picture (an elevated view of the vehicle from above). That is, the conventional vehicular image system is unable to provide diverse and detailed viewing-angle pictures.

Thus, a display control method for a vehicular image is needed to provide various and informative viewing-angle pictures.

SUMMARY OF THE INVENTION

It is therefore an objective of the present invention to provide a method for controlling a display of a vehicular image by a touch panel, and a related vehicular image system to solve the above problems.

A method for controlling a display of a vehicular image by a touch panel is provided. The vehicular image is synthesized by a plurality of sub-images. The method comprises the following steps: detecting a first touch event on the touch panel to generate touch position information; determining a control parameter according to the touch position information; and switching a viewing-angle stage of the vehicular image according to the control parameter.

A vehicular image system comprises a touch panel, a detection unit and a processing unit. The detection unit is coupled to the touch panel, and is arranged for detecting a first touch event on the touch panel to generate touch position information. The processing unit is coupled to the touch panel and the detection unit, and is arranged for receiving a plurality of sub-images, synthesizing the sub-images to generate a vehicular image according to a control parameter, adjusting the control parameter according to the touch position information, and switching a viewing-angle stage of the vehicular image according to the control parameter.

The proposed method and vehicular image system, which control a display of a vehicular image according to a current viewing-angle stage of the vehicular image and a touch event occurring on a touch panel, may not only provide various traffic information and road conditions, but also enable convenient and intuitive operations for the user.

These and other objectives of the present invention will no doubt become obvious to those of ordinary skill in the art after reading the following detailed description of the preferred embodiment that is illustrated in the various figures and drawings.

DETAILED DESCRIPTION

In order to provide a convenient operation interface for a user/driver to obtain various viewing-angle pictures which contain sufficient display information, the disclosed embodiments of the present invention use a touch panel to control a display of a vehicular image, wherein an AVM image of the vehicular image may be a two-dimensional (2D) AVM image or a three-dimensional (3D) AVM image. By switching a viewing-angle stage of the vehicular image through an intuitive operation, the user may obtain a variety of viewing-angle pictures and adjust a display of the vehicular image without switching a current viewing-angle stage thereof. Hence, complete surrounding traffic conditions of a vehicle can be obtained.

Figure 1:
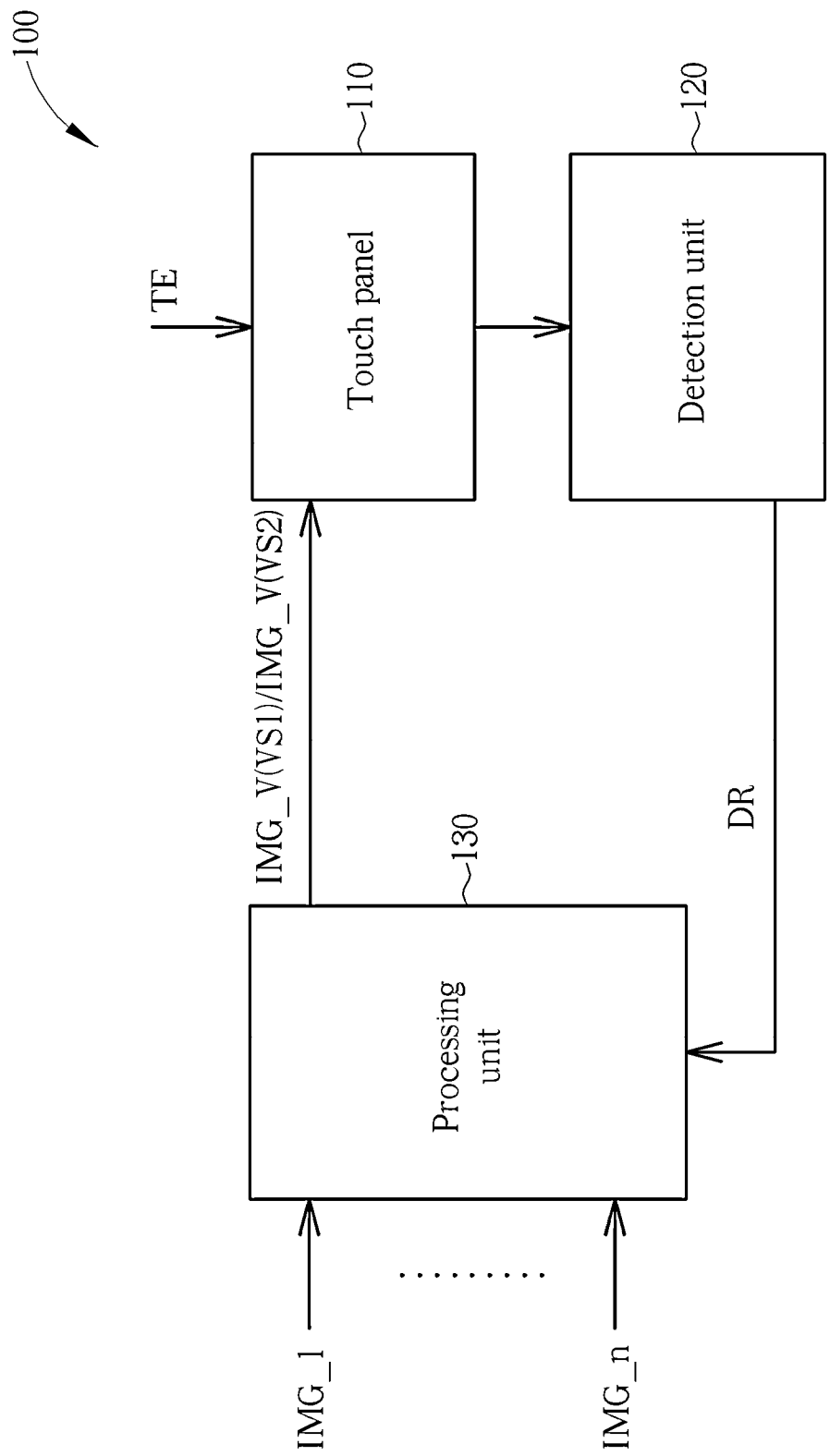
FIG. 1 is a diagram illustrating an exemplary vehicular image system according to an embodiment of the present invention.

Please refer to FIG. 1, which is a diagram illustrating an exemplary vehicular image system according to an embodiment of the present invention. The vehicular image system 100 may include a touch panel/screen 110, a detection unit 120 and a processing unit 130. First, the processing unit 130 may receive a plurality of sub-images IMG_1-IMG_n, and synthesize the sub-images IMG_1-IMG_n to generate a vehicular image IMG_V(VS1) at a first viewing-angle stage (i.e. a default vehicular image) according to a control parameter, thereby displaying the vehicular image IMG_V(VS1) on the touch panel 110. More specifically, the processing unit 130 may perform an image operation including a geometric transformation upon the sub-images IMG__1-IMG_n to generate an AVM image according to the control parameter, and then synthesize the AVM image and a vehicle image to generate the vehicular image IMG_V(VS1), wherein the vehicle image may be pre-stored in the processing unit 130. In addition, when the control parameter is a bird's-eye view parameter, a display of the vehicular image IMG_V(VS1) on the touch panel 110 is a top view, i.e. the first viewing-angle stage is a top-view stage.

The processing unit 130 is coupled to the touch panel 110 and the detection unit 120, and the touch panel 110 is coupled to the detection unit 120. When a first touch event TE1 occurs on the touch panel 110, the detection unit 120 may detect the first touch event TE1 to generate touch position information DR, e.g. the number, touch position(s) and/or path(s) of motion of touch object(s). The processing unit 130 may adjust the control parameter according to the touch position information DR, and selectively switch the display of the vehicular image IMG_V(VS1) from the first viewing-angle stage (e.g. the top-view stage) to a second viewing-angle stage (e.g. a tilted top-view stage or a side-view stage), thereby displaying a vehicular image IMG_V(VS2) at the second viewing-angle stage on the touch panel 110.

It should be noted that, as the touch position information DR may include the number, the touch position(s) and/or the path(s) of motion of the touch object(s), the processing unit 130 may interpret/identify the touch position information DR and accordingly switch a viewing-angle stage of the vehicular image IMG_V(VS1). For example, a plurality of trigger areas may be defined on the touch panel 110, and when the touch position information DR indicates that a touch position of the first touch event TE1 is located in one of the trigger areas, the processing unit 130 may switch the vehicular image IMG_V (VS1) to the vehicular image IMG_V(VS2). In an alternative design, when the touch position information DR indicates that the touch position of the first touch event TE1 is located in one of the trigger areas, and the touch position information DR corresponds to a specific gesture (e.g. a single tap or a double tap), the processing unit 130 may switch the vehicular image IMG_V(VS1) to another vehicular image, whose viewing-angle stage (e.g. a side-view stage) is different from that of the vehicular image IMG_V(VS2).

Figure 2:
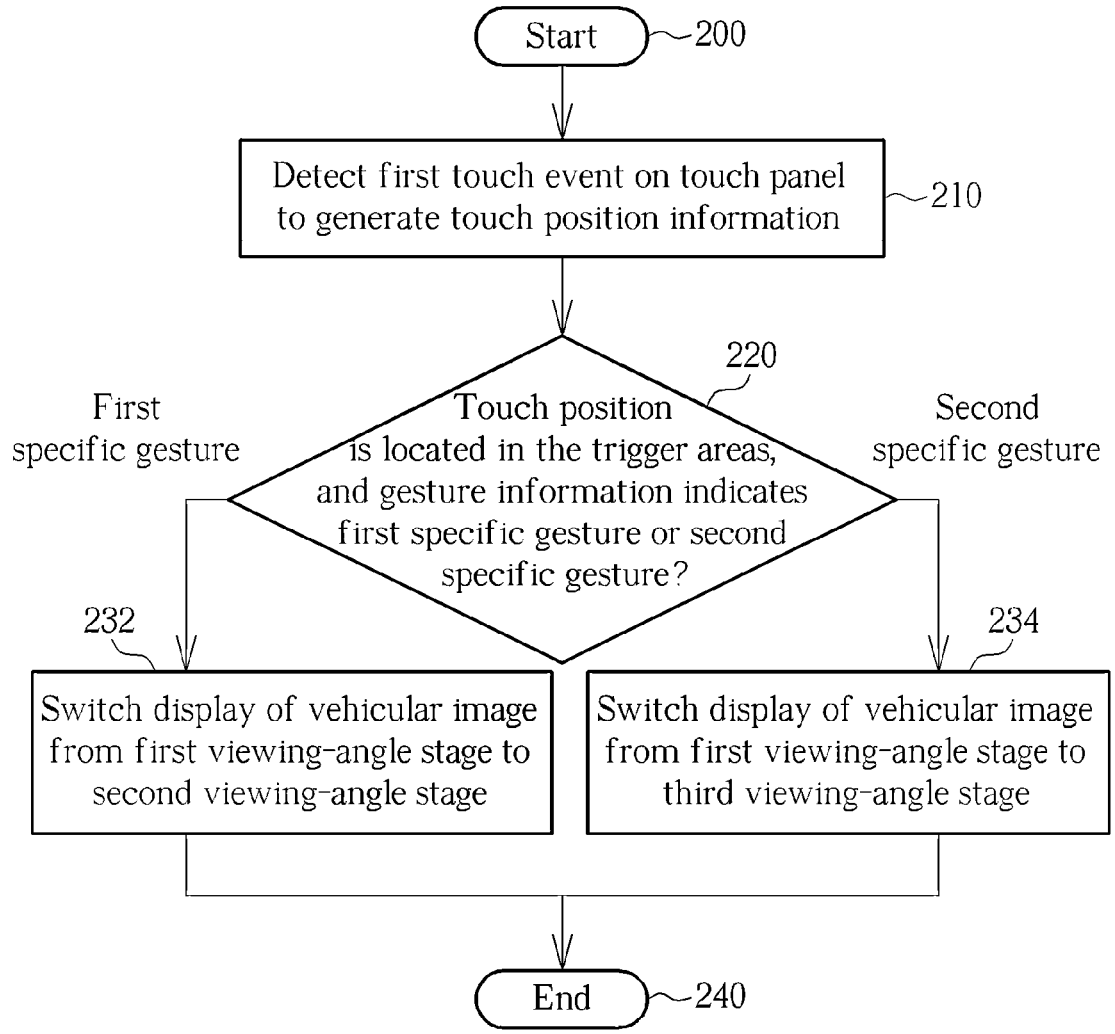
FIG. 2 is a flow chart of a method for switching a viewing-angle stage of a vehicular image according to an embodiment of the present invention.

Please refer to FIG. 2 in conjunction with FIG. 1. FIG. 2 is a flow chart of a method for switching a viewing-angle stage of a vehicular image according to an embodiment of the present invention. The method shown in FIG. 2 may be employed in the vehicular image system 100 shown in FIG. 1, and may be summarized as follows.

Step 200: Start.

Step 210: Detect the first touch event TE1 on the touch panel 110 to generate the touch position information DR, wherein the touch position information DR includes the number, the touch position(s) and/or the path(s) of motion of the touch object(s) on the touch panel 110.

Step 220: Identify the touch position information DR to generate gesture information, and determine whether a touch position of the first touch event TE1 on the touch panel 110 is located in any one of the trigger areas on the touch panel 110. If the gesture information indicates a first specific gesture (e.g. a single tap) and the touch position is located in one of the trigger areas, go to step 232; if the gesture information indicates a second specific gesture (e.g. a double tap) and the touch position is located in one of the trigger areas, go to step 234.

Step 232: Determine the control parameter according to the first specific gesture and a position of the trigger area, and switch the display of the vehicular image from the first viewing-angle stage (e.g. the top-view stage) to the second viewing-angle stage (e.g. the tilted top-view stage) according to the control parameter.

Step 234: Determine the control parameter according to the second specific gesture and a position of the trigger area, and switch the display of the vehicular image from the first viewing-angle stage (e.g. the top-view stage) to a third viewing-angle stage (e.g. the side-view stage) according to the control parameter, wherein the third viewing-angle stage is different from the second viewing-angle stage.

Step 240: End.

In step 220, the processing unit 130 may determine the control parameter according to the touch position and the gesture information included in the touch position information DR. When the touch position of the first touch event TE1 is located in a trigger area of the trigger areas, the processing unit 130 may switch the vehicular image to different viewing-angle stages according to different gestures in step 232 and step 243. In one implementation, the processing unit 130 may switch the viewing-angle stage only according to the trigger area of the first touch event TE1 on the touch panel 110. For brevity and clarity, the following description refers to both the touch position and the gesture information to illustrate one exemplary viewing-angle switching. A person skilled in the art should understand that the viewing-angle stage switching of the vehicular image may also be realized by referring to only one of the touch position and the gesture information. Further description is detailed as follows.

Figure 3:
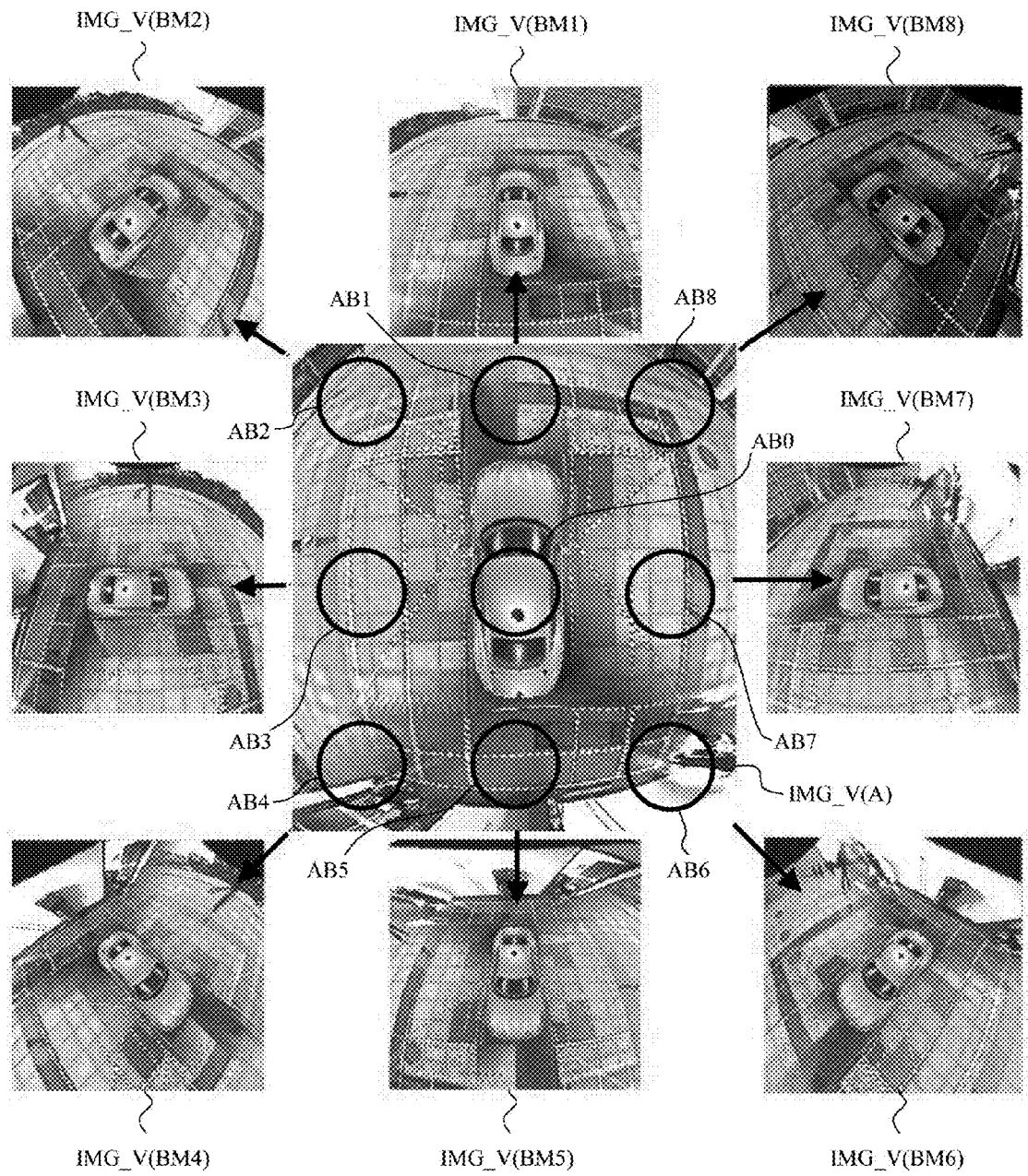
FIG. 3 is a diagram illustrating an exemplary viewing-angle stage switching of a vehicular image displayed on the touch panel shown in FIG. 1 according to a first embodiment of the present invention.

Please refer to FIG. 3 in conjunction with FIG. 1. FIG. 3 is a diagram illustrating an exemplary viewing-angle stage switching of a vehicular image displayed on the touch panel 110 shown in FIG. 1 according to a first embodiment of the present invention. In this embodiment, the vehicular image displayed on the touch panel 110 is a vehicular image IMG_V (A) at a top-view stage. When the user touches the touch panel 110 with a finger or other object (e.g. a stylus), the detection unit 120 may generate the touch position information DR, and the processing unit 130 may determine whether to switch a viewing-angle stage of the vehicular image IMG_V(A) from the top-view stage to a tilted top-view stage according to the touch position information DR. In practice, a predetermined area AB0 as well as a plurality of trigger areas AB1-AB8 may be defined on the touch panel 110, wherein the predetermined area AB0 corresponds to a default parameter setting, and the trigger areas AB1-AB8 correspond to different parameter settings, respectively. In this embodiment, the parameter setting of the control parameter corresponding to the predetermined area AB0 corresponds to the vehicular image IMG_V (A) at the top-view stage, and parameter settings of control parameters corresponding to the trigger areas AB1-AB8 correspond to a plurality of viewing-angle pictures at the tilted top-view stage, respectively. For example, when the user taps the trigger area AB1 once, the vehicular image IMG_V(A) displayed on the touch panel 110 may be switched to a vehicular image IMG_V(BM1) which is a rear top view.

In view of the above description, the user may view the vehicular image displayed on the touch panel at a desired viewing angle by touching a plurality of trigger areas on the touch panel 110. Additionally, the correspondence between the trigger areas AB1-AB8 and the vehicular images IMG_V (BM1)-IMG_V(BM8) may be designed according to actual requirements. For example, when the user taps an area behind the vehicle area in the vehicular image IMG_V(A) (i.e. the trigger area AB5) once, it may imply that the user wants to know the road conditions in the area behind the vehicle. Hence, the control parameter may be adjusted to a parameter setting required for taking a view of the back of the vehicle (i.e. the vehicular image IMG_V(A) will be switched to the vehicular image IMG_V(BM5). In an alternative design, when the user taps the trigger area AB5 once, it may imply that the user wants to take a view from behind and above the vehicle in order to know the road conditions in front of the vehicle. Hence, the control parameter may be adjusted to a parameter setting required for a forward view (i.e. the vehicular image IMG_V(A) will be switched to the vehicular image IMG_V(BM1). In brief, the aforementioned correspondence between the trigger area and the vehicular image is for illustrative purposes only, and is not meant to be a limitation of the present invention.

Figure 4:
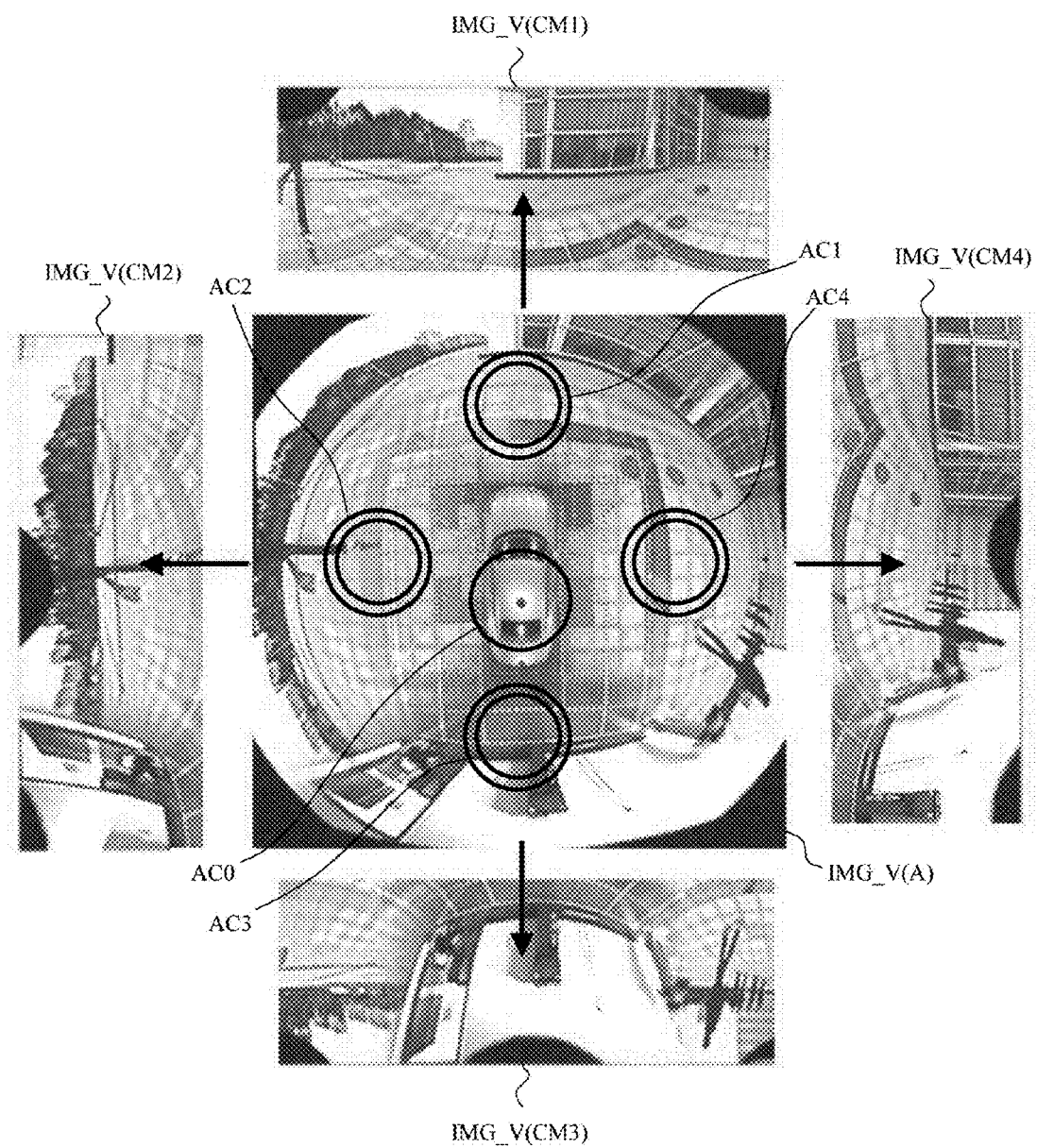
FIG. 4 is a diagram illustrating an exemplary viewing-angle stage switching of a vehicular image displayed on the touch panel shown in FIG. 1 according to a second embodiment of the present invention.

It should be noted that the operation for switching the viewing-angle stage of the vehicular image IMG_V(A) is not limited to the single tap, and the number of pictures to be switched may be adjusted according to actual requirements/considerations. Please refer to FIG. 4 in conjunction with FIG. 1. FIG. 4 is a diagram illustrating an exemplary viewing-angle stage switching of a vehicular image displayed on the touch panel 110 shown in FIG. 1 according to a second embodiment of the present invention. In this embodiment, the viewing-angle stage of the vehicular image IMG_V(A) may be switched to a side-view stage by a double tap, wherein the side-view stage includes a plurality of viewing-angle pictures. In practice, a predetermined area AC0 as well as a plurality of trigger areas AC1-AC4 may be defined on the touch panel 110, wherein the predetermined area AC0 corresponds to a default parameter setting, and the trigger areas AC1-AC4 correspond to different parameter settings, respectively. In this embodiment, a parameter setting of a control parameter corresponding to the predetermined area AC0 corresponds to the vehicular image IMG_V(A) at the top-view stage, and parameter settings of control parameters corresponding to the trigger areas AC1-AC4 correspond to a plurality of viewing-angle pictures at the side-view stage, respectively. For example, when the user taps the trigger area AC1 twice, the vehicular image IMG_V(A) displayed on the touch panel 110 may be switched to a vehicular image IMG_V(CM1) which is a forward eye-level view (i.e. a side view).

Similarly, the correspondence between the trigger areas AC1-AC4 and the vehicular images IMG_V(CM1)-IMG_V(CM4) may be designed according to actual requirements. For example, when the user taps the trigger area AC3 twice, it may imply that the user wants to know road conditions at the back of the vehicle area. Hence, the vehicular image IMG_V(A) will be switched to the vehicular image IMG_V(CM3).

In view of the above description, after trigger areas are defined on the touch panel 110 shown in FIG. 1, the user may touch the same trigger area using different gestures to thereby switch a viewing-angle stage of a vehicular image to a desired viewing-angle stage. More specifically, in a case where the trigger areas AB1- AB8 shown in FIG. 3 are defined on the touch panel 110, if the user wants to view road conditions in front of the vehicle in a tilted top view, the user may tap the trigger area AB 1 once; if the user wants to view road conditions in front of the vehicle in a side view, the user may tap the trigger area AB 1 twice.

After the viewing-angle stage of the vehicular image is switched from a first viewing-angle stage (e.g. a top-view stage) to a second viewing-angle stage (e.g. a tilted top-view/side-view stage), a second touch event on the touch panel may be detected to generate touch position information, and the viewing-angle stage of the vehicular image may be selectively switched from the second viewing-angle stage to the first viewing-angle stage according to the touch position information. For example, when the touch position information indicates that a touch position of the second touch event on the touch panel is located in a specific area on the touch panel, the viewing-angle stage of the vehicular image will be switched from the second viewing-angle stage to the first viewing-angle stage. Please refer to FIG. 3 again. After the vehicular image IMG_V(A) is switched to the vehicular image IMG_V(BM1), the user may touch a vehicle area of the vehicular image IMG_V(BM1) in order to switch it back to the vehicular image IMG_V(A). In one implementation, the user may touch an icon area (e.g. an icon labeled "previous page" (not shown in FIG. 3)) of the vehicular image IMG_V(BM1) in order to switch it back to the vehicular image IMG_V(A). Please refer to FIG. 4 again. After the vehicular image IMG_V(A) is switched to the vehicular image IMG_V(CM1), the user may touch an icon area (e.g. an icon labeled "previous page" (not shown in FIG. 4)) of the vehicular image IMG_V(CM1) in order to switch it back to the vehicular image IMG_V(A).

In addition to touching a specific area in the vehicular image to switch the viewing-angle of the vehicular image back to the first viewing-angle stage, performing a specific gesture upon the touch panel may achieve the same objective (i.e. determining if the touch position information corresponds to the specific gesture). For example, in the first embodiment shown in FIG. 3, after tapping the trigger area AB1 once to switch the vehicular image IMG_V(A) to the vehicular image IMG_V(BM1), the user may tap any image area in the vehicular image IMG_V(BM1) twice to switch it back to the vehicular image IMG_V(A). Similarly, in the embodiment shown in FIG. 4, after tapping the trigger area AC1 twice to switch the vehicular image IMG_V(A) to the vehicular image IMG_V(CM1), the user may tap any image area in the vehicular image IMG_V(CM1) to switch it back to the vehicular image IMG_V(A).

In brief, according to different gestures and different touch positions, the display of the vehicular image may be switched to a picture desired by the user. Please note that the above is for illustrative purposes only, and is not meant to be a limitation of the present invention. In one implementation, the single-tap gesture may be used to switch the top-view stage to the side-view stage, and the double-tap gesture may be used to switch the top-view stage to the tilted top-view stage. In another implementation, a gesture different from the single-tap gesture and the double-tap gesture may be used to switch the viewing-angle stage of the vehicular image. In addition, a default display of the vehicular image is not limited to a top-view picture. For example, the default display of the vehicular image may be a tilted top-view picture. Moreover, the number of the trigger areas defined on the touch panel may depend on the user's requirements, and the viewing-angle stage to be switched is not limited to the top-view stage, the tilted top-view stage and the side-view stage.

Figure 5:
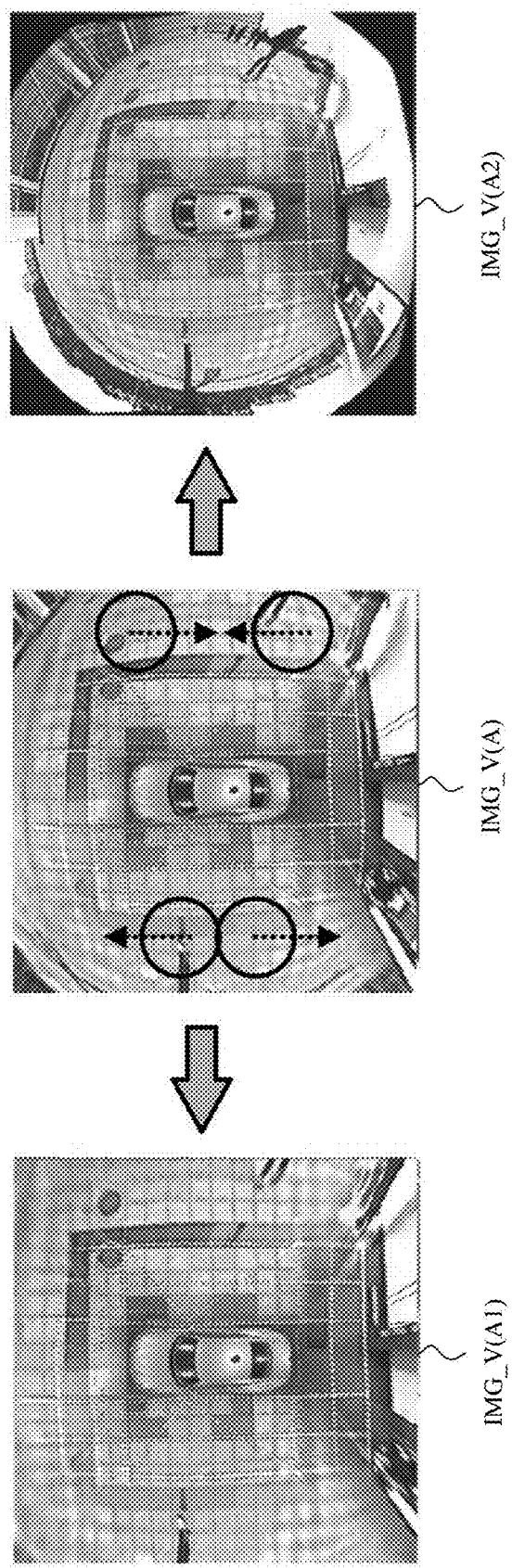
FIG. 5 is a diagram illustrating exemplary display adjustment of a vehicular image under the same viewing-angle stage according to a first embodiment of the present invention.

In addition to switching the viewing-angle stage, touch operations performed upon the touch panel may adjust the display of the vehicular image without switching the viewing-angle stage. Please refer to FIG. 1, FIG. 3 and FIG. 5 together. FIG. 5 is a diagram illustrating exemplary display adjustment of a vehicular image under the same viewing-angle stage according to a first embodiment of the present invention. As shown in FIG. 5, when the user operates the touch panel 110 by moving two fingers away from each other, the processing unit 130 may adjust the control parameter to zoom in on the display of the vehicular image IMG_V(A), thereby outputting the vehicular image IMG_V(A1) to the touch panel 110; when the user operates the touch panel 110 by bringing two fingers together, the processing unit 130 may adjust the control parameter to zoom out on the display of the vehicular image IMG_V(A), thereby outputting the vehicular image IMG_V(A2) to the touch panel 110. Please note that these zoom operations may be employed in the vehicular images IMG_V(BM1)-IMG_V(BM8) which are at the tilted top-view stage.

It should be noted that when a display of a vehicular image is adjusted to the vehicular image IMG_V(A1), the user may touch an image area (e.g. a vehicle area) in the vehicular image IMG_V(A1) in order to adjust the display of the vehicular image to the vehicular image IMG_V(A). For example, the control parameter of the vehicular image may be adjusted to the default parameter setting by touching the predetermined area AB0 on the touch panel 110.

Figure 6:
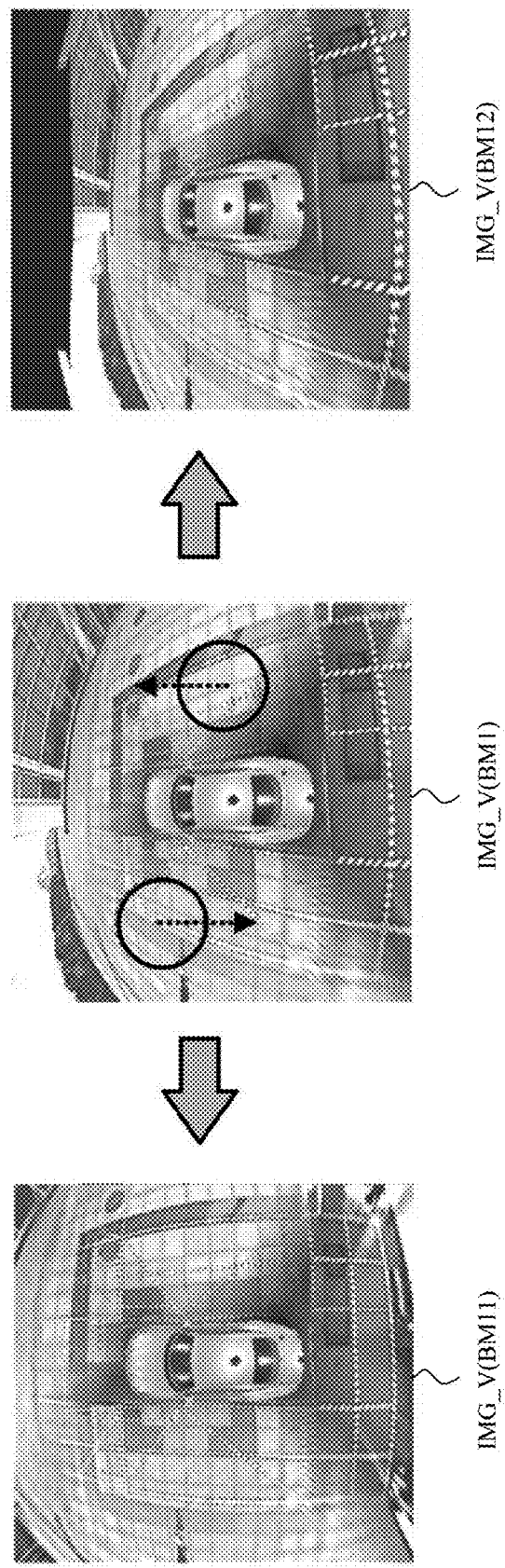
FIG. 6 is a diagram illustrating exemplary display adjustment of a vehicular image under the same viewing-angle stage according to a second embodiment of the present invention.

In a case where the viewing-angle stage is not switched, the gesture for the display adjustment of the vehicular image is not limited to moving two fingers away from each or bringing them together, and the display adjustment of the vehicular image is not limited to zooming in and zooming out on the vehicular image. Please refer to FIG. 1 and FIG. 6 together. FIG. 6 is a diagram illustrating exemplary display adjustment of a vehicular image under the same viewing-angle stage according to a second embodiment of the present invention. As shown in FIG. 6, when the user drags a finger downwards on the touch panel 110, the processing unit 130 may adjust the control parameter to perform a keystone correction upon the vehicular image IMG_V(BM1), thereby outputting the vehicular image IMG_V(BM11) to the touch panel 110; when the user drags a finger upwards on the touch panel 110, the processing unit 130 may adjust the control parameter to perform a keystone correction upon the vehicular image IMG_V(BM1), thereby outputting the vehicular image IMG_V(BM12) to the touch panel 110.

Figure 7:
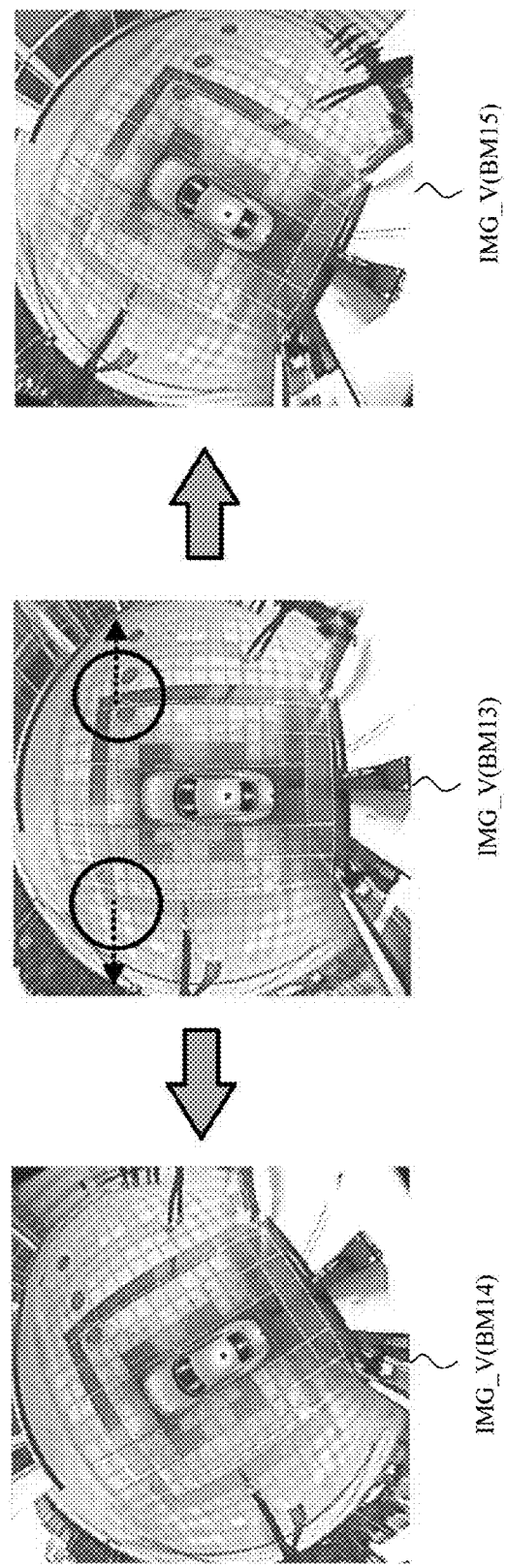
FIG. 7 is a diagram illustrating exemplary display adjustment of a vehicular image under the same viewing-angle stage according to a third embodiment of the present invention.

Please refer to FIG. 1 and FIG. 7 together. FIG. 7 is a diagram illustrating exemplary display adjustment of a vehicular image under the same viewing-angle stage according to a third embodiment of the present invention. As shown in FIG. 7, when the user drags a finger leftwards on the touch panel 110, the processing unit 130 may adjust the control parameter to rotate the vehicular image IMG_V(BM13) (at the tilted top-view stage) in a counterclockwise direction, thereby outputting the vehicular image IMG_V(BM14) to the touch panel 110; when the user drags a finger rightwards on the touch panel 110, the processing unit 130 may adjust the control parameter to rotate the vehicular image IMG_V (BM13) in a clockwise direction, thereby outputting the vehicular image IMG_V(BM15) to the touch panel 110.

Figure 8:
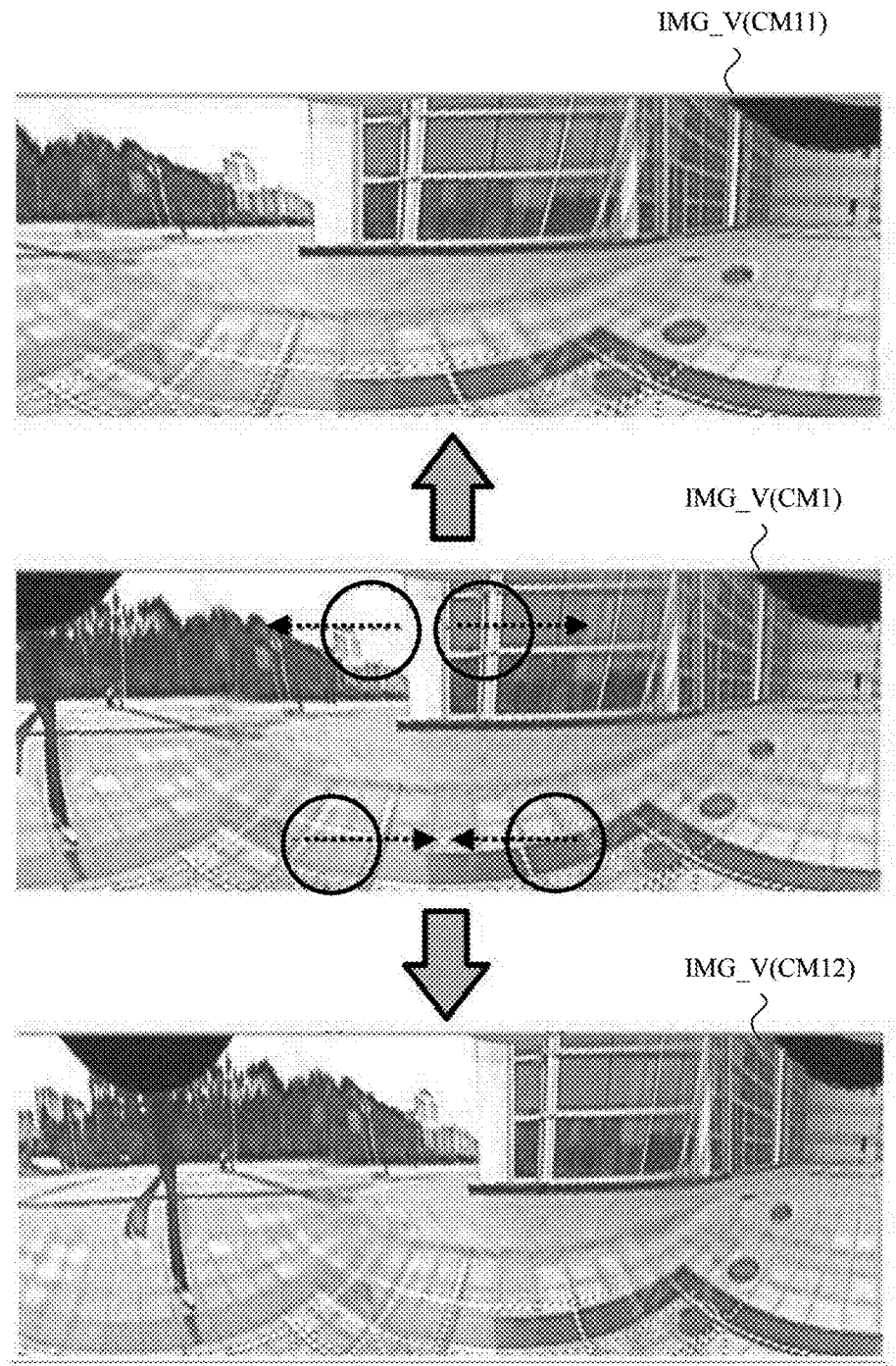
FIG. 8 is a diagram illustrating exemplary display adjustment of a vehicular image under the same viewing-angle stage according to a fourth embodiment of the present invention.

Please refer to FIG. 8, which is a diagram illustrating exemplary display adjustment of a vehicular image under the same viewing-angle stage according to a fourth embodiment of the present invention. As shown in FIG. 8, the user may move two fingers away from each other in order to decrease a display range of the vehicular image IMG_V(CM1) shown in FIG. 4, thereby adjusting the display on the touch panel 110 shown in FIG. 1 to the vehicular image IMG_V(CM11). Additionally, the user may bring two fingers together in order to increase the display range of the vehicular image IMG_V (CM1) shown in FIG. 4, thereby adjusting the display on the touch panel 110 shown in FIG. 1 to the vehicular image IMG_V(CM12).

Figure 9:
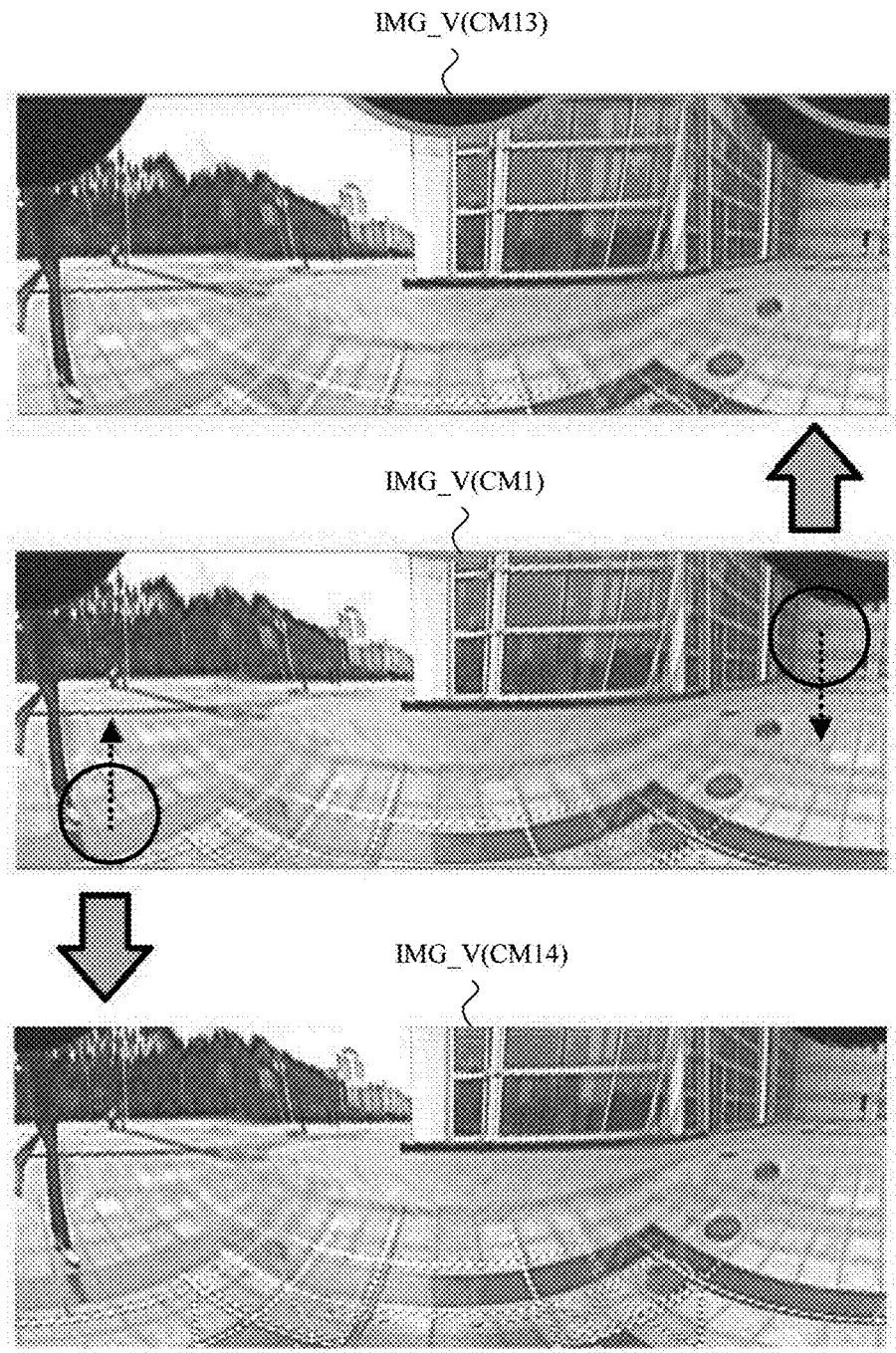
FIG. 9 is a diagram illustrating exemplary display adjustment of a vehicular image under the same viewing-angle stage according to a fifth embodiment of the present invention.

Please refer to FIG. 9, which is a diagram illustrating exemplary display adjustment of a vehicular image under the same viewing-angle stage according to a fifth embodiment of the present invention. As shown in FIG. 9, the user may perform a downward drag gesture in order to shift the vehicular image IMG_V(CM1) shown in FIG. 4 in a downward direction, thereby adjusting the display on the touch panel 110 shown in FIG. 1 to the vehicular image IMG_V(CM13). Additionally, the user may perform an upward drag gesture in order to shift the vehicular image IMG_V(CM1) shown in FIG. 4 in an upward direction, thereby adjusting the display on the touch panel 110 shown in FIG. 1 to the vehicular image IMG_V(CM14).

Figure 10:
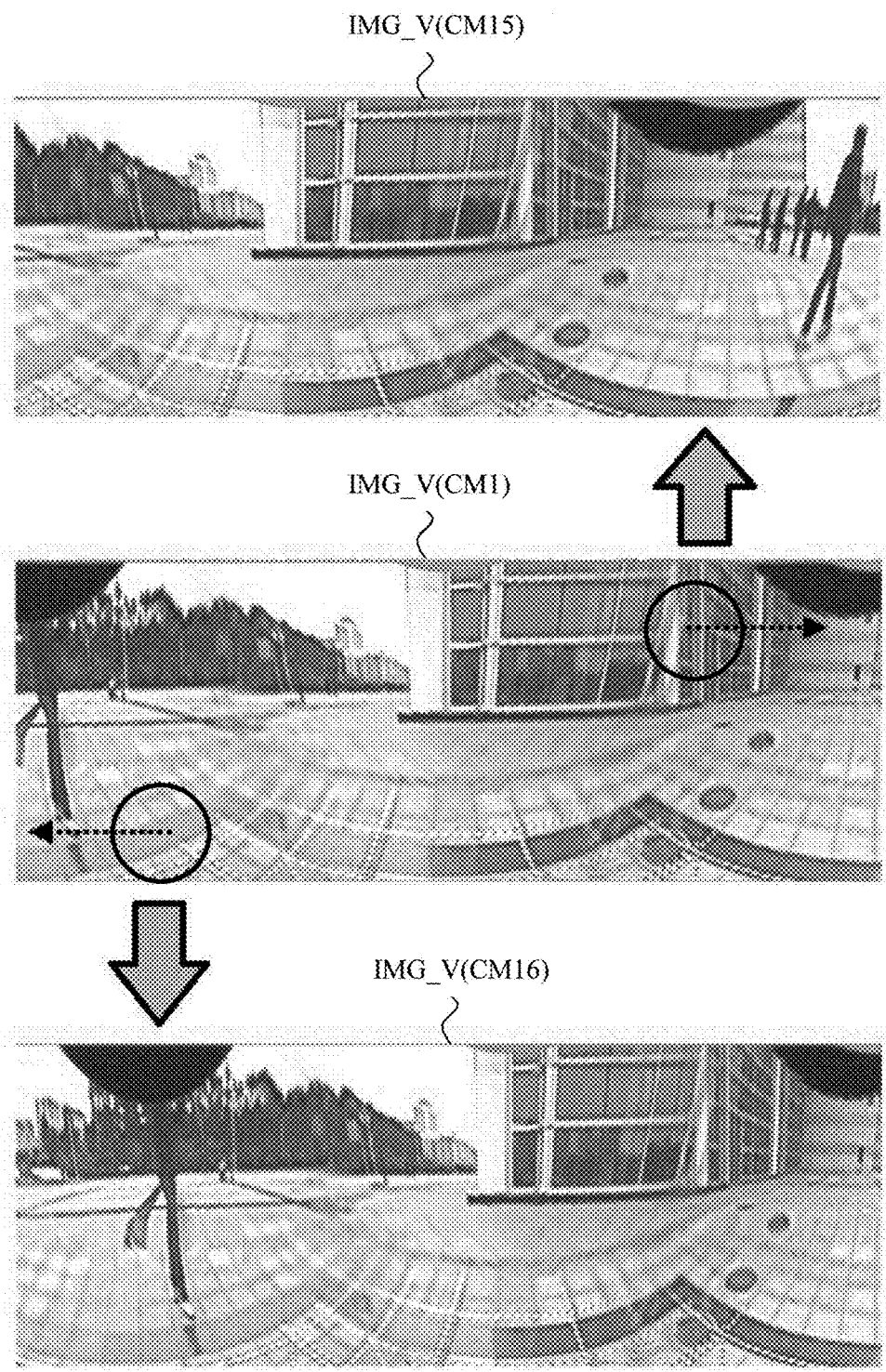
FIG. 10 is a diagram illustrating exemplary display adjustment of a vehicular image under the same viewing-angle stage according to a sixth embodiment of the present invention.

Please refer to FIG. 10, which is a diagram illustrating exemplary display adjustment of a vehicular image under the same viewing-angle stage according to a sixth embodiment of the present invention. As shown in FIG. 10, the user may perform a rightward drag gesture in order to shift the display range of the vehicular image IMG_V(CM1) shown in FIG. 4 in a rightward direction (i.e. shifting the vehicular image IMG_V(CM1) in a leftward direction), thereby adjusting the display on the touch panel 110 shown in FIG. 1 to the vehicular image IMG_V(CM15). Additionally, the user may perform a leftward drag gesture in order to shift the display range of the vehicular image IMG_V(CM1) shown in FIG. 4 in a leftward direction (i.e. shifting the vehicular image IMG_V (CM1) in a rightward direction), thereby adjusting the display on the touch panel 110 shown in FIG. 1 to the vehicular image IMG_V(CM16).

To sum up, the proposed method and vehicular image system, which control a display of a vehicular image according to a current viewing-angle stage of the vehicular image and a touch event occurring on a touch panel, may not only provide various traffic information and road conditions, but also enable convenient and intuitive operations for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method for controlling a display of a vehicular image by a touch panel, the vehicular image being synthesized by a plurality of sub-images, the method comprising:
    displaying the vehicular image at a first view-angle stage on the touch panel, wherein a displayed content of the vehicular image at the first view-angle stage comprises a view in front of, a view in back of, a view on the right of and a view on the left of a vehicle;
    detecting a first touch event on the touch panel to generate touch position information;
    determining a control parameter according to the touch position information;
    switching the vehicular image from the first view-angle stage to a second view-angle stage different from the first view-angle stage according to the control parameter; and
    when the vehicular image is switched to the second view-angle stage, displaying the vehicular image at the second view-angle stage on the touch panel, wherein a displayed content of the vehicular image at the second view-angle stage comprises more than one view selected from another view in front of, another view in back of, another view on the right of and another view on the left of the vehicle;
    wherein a touch position of the first touch event on the touch panel is overlapped with the vehicular image; and wherein the touch position on the displayed vehicular image is used to determine a view angle at which the vehicular image is displayed on the touch panel at the second view-angle stage.

2. The method of claim 1, wherein the step of determining the control parameter according to the touch position information comprises:
determining if a touch position of the first touch event on the touch panel is located in any one of a plurality of trigger areas on the touch panel according to the touch position information; and
when the touch position is located in a trigger area of the trigger areas, determining the control parameter at least according to a position of the trigger area.

3. The method of claim 2, wherein the second viewing-angle stage comprises a plurality of viewing-angle pictures; the control parameter comprises parameter settings of the viewing-angle pictures respectively corresponding to the trigger areas; and each parameter setting is used to determine a corresponding viewing-angle picture when the vehicular image is switched to the second viewing-angle stage.

4. The method of claim 1, wherein the step of determining the control parameter according to the touch position information further comprises:
identifying the touch position information to generate gesture information; and
determining the control parameter according to the position of the trigger area and the gesture information.

5. The method of claim 4, wherein when the gesture information indicates a first specific gesture, the vehicular image is switched from the first viewing-angle stage to the second viewing-angle stage; when the gesture information indicates a second specific gesture different from the first specific gesture, the vehicular image is switched from the first viewing-angle stage to a third viewing-angle stage different from the second viewing-angle stage.

6. The method of claim 1, wherein after the vehicular image is switched from the first viewing-angle stage to the second viewing-angle stage, the method further comprises:
detecting a second touch event on the touch panel to generate another touch position information;
determining if a touch position of the second touch event on the touch panel is located in a specific area on the touch panel according to the other touch position information; and
when the touch position of the second touch event on the touch panel is located in the specific area on the touch pane, switching the vehicular image from the second viewing-angle stage to the first viewing-angle stage.

7. The method of claim 6, wherein the specific area corresponds to a vehicle area in the vehicular image.

8. The method of claim 6, wherein the specific area corresponds to an icon area in the vehicular image.

9. The method of claim 1, wherein after the vehicular image is switched from the first viewing-angle stage to the second viewing-angle stage, the method further comprises:
detecting a second touch event on the touch panel to generate another touch position information;
determining if the other touch position information corresponds to a specific gesture; and
when the other touch position information corresponds to the specific gesture, switching the vehicular image from the second viewing-angle stage to the first viewing-angle stage.

10. A vehicular image system, comprising:
a touch panel, for displaying a vehicular image at a first view-angle stage, wherein a displayed content of the vehicular image at the first view-angle stage comprises a view in front of, a view in back of, a view on the right of and a view on the left of a vehicle;
a detection unit, coupled to the touch panel, for detecting a first touch event on the touch panel to generate touch position information; and
a processing unit, coupled to the touch panel and the detection unit, for receiving a plurality of sub-images, synthesizing the sub-images to generate the vehicular image according to a control parameter, adjusting the control parameter according to the touch position information, and switching the vehicular image from the first view-angle stage to a second view-angle stage different from the first view-angle stage according to the control parameter;
wherein when the vehicular image is switched to the second view-angle stage, the touch panel further displays the vehicular image at the second view-angle stage, and a displayed content of the vehicular image at the second view-angle stage comprises more than one view selected from another view in front of, another view in back of, another view on the right of and another view on the left of the vehicle;
wherein a touch position of the first touch event on the touch panel is overlapped with the vehicular image; and
wherein the touch position on the displayed vehicular image is used to determine a view angle at which the vehicular image is displayed on the touch panel at the second view-angle stage.

11. The vehicular image system of claim 10, wherein the processing unit determines if a touch position of the first touch event on the touch panel is located in any one of a plurality of trigger areas on the touch panel according to the touch position information, and when the touch position is located in a trigger area of the trigger areas, the processing unit determines the control parameter at least according to a position of the trigger area.

12. The vehicular image system of claim 11, wherein the second viewing-angle stage comprises a plurality of viewing-angle pictures; the control parameter comprises parameter settings of the viewing-angle pictures respectively corresponding to the trigger areas; and each parameter setting is used to determine a corresponding viewing-angle picture when the vehicular image is switched to the second viewing-angle stage.

13. The vehicular image system of claim 11, wherein the processing unit further identifies the touch position information to generate gesture information, and determines the control parameter according to the position of the trigger area and the gesture information.

14. The vehicular image system of claim 13, wherein when the gesture information indicates a first specific gesture, the vehicular image is switched from the first viewing-angle stage to the second viewing-angle stage; when the gesture information indicates a second specific gesture different from the first viewing-angle stage, the viewing-angle stage of the vehicular image is switched from the first viewing-angle stage to a third viewing-angle stage different from the second viewing-angle stage.

15. The vehicular image system of claim 10, wherein after the vehicular image is switched from the first viewing-angle stage to the second viewing-angle stage, the processing unit further detects a second touch event on the touch panel to generate another touch position information, and determines if a touch position of the second touch event on the touch panel is located in a specific area on the touch panel according to the other touch position information; and when the touch position is located in the specific area, the processing unit further switches the vehicular image from the second viewing-angle stage to the first viewing-angle stage.

16. The vehicular image system of claim 15, wherein the specific area corresponds to a vehicle area of the vehicular image.

17. The vehicular image system of claim 15, wherein the specific area corresponds to an icon area of the vehicular image.

18. The vehicular image system of claim 10, wherein after the vehicular image is switched from the first viewing-angle stage to the second viewing-angle stage, the processing unit further detects a second touch event on the touch panel to generate another touch position information, and determines if the other touch position information corresponds to a specific gesture; and when the other touch position information corresponds to the specific gesture, the processing unit further switches the vehicular image from the second viewing-angle stage to the first viewing-angle stage.

* * * * *